US009917310B2

(12) United States Patent
Hashimoto et al.

(10) Patent No.: US 9,917,310 B2
(45) Date of Patent: Mar. 13, 2018

(54) GAS FLOW CHANNEL FORMING BODY FOR FUEL CELL, AND FUEL CELL

(71) Applicants: Keiji Hashimoto, Kariya (JP); Kousuke Kawajiri, Kariya (JP); Satoshi Futami, Kariya (JP)

(72) Inventors: Keiji Hashimoto, Kariya (JP); Kousuke Kawajiri, Kariya (JP); Satoshi Futami, Kariya (JP)

(73) Assignee: Toyota Shatai Kabushiki Kaisha, Kariya-Shi, Aichi-Ken (JP)

( * ) Notice: Subject to any disclaimer, the term of this patent is extended or adjusted under 35 U.S.C. 154(b) by 456 days.

(21) Appl. No.: 14/421,969

(22) PCT Filed: Jan. 23, 2014

(86) PCT No.: PCT/JP2014/051347
§ 371 (c)(1),
(2) Date: Feb. 16, 2015

(87) PCT Pub. No.: WO2014/132707
PCT Pub. Date: Sep. 4, 2014

(65) Prior Publication Data
US 2015/0221958 A1 Aug. 6, 2015

(30) Foreign Application Priority Data
Feb. 28, 2013 (JP) .................................. 2013-039097

(51) Int. Cl.
*H01M 8/24* (2016.01)
*H01M 8/0258* (2016.01)
(Continued)

(52) U.S. Cl.
CPC ....... *H01M 8/0258* (2013.01); *H01M 8/0254* (2013.01); *H01M 8/04119* (2013.01);
(Continued)

(58) Field of Classification Search
CPC ............. H01M 8/0258; H01M 8/0254; H01M 8/04119; H01M 8/2457; H01M 8/1018;
(Continued)

(56) References Cited

U.S. PATENT DOCUMENTS

2006/0204806 A1* 9/2006 Takada ................ H01M 8/0267
429/434
2009/0098435 A1* 4/2009 Shibata ............... H01M 8/0247
429/458

FOREIGN PATENT DOCUMENTS

JP 63-86361 A 4/1988
JP 2004-119084 A 4/2004
(Continued)

OTHER PUBLICATIONS

Extended European Search Report for Application No. 14757068.3, dated Sep. 8, 2016 (6 pgs.).
(Continued)

*Primary Examiner* — Gary Harris
(74) *Attorney, Agent, or Firm* — Bradley J. Thorson; Patterson Thuente Pedersen, P.A.

(57) ABSTRACT

Gas flow channels are provided between protrusions arranged in parallel on a first surface of a partition wall of a gas flow channel forming body, and water introduction channels are provided in valleys on the opposite side of each protrusion, on a second surface. In order to allow the gas flow channels and the water introduction channels to communicate so that water can pass there through, communication channels is provided to the partition wall. Intermediate structures are correspondingly provided inside the water introduction channels to the communication channels. A set of communication channels is formed by a pair of communication channels positioned at a first interval. A set of communication channels and another set of communication (Continued)

channels adjacent thereto are positioned on each protrusion with a second interval therebetween.

8 Claims, 4 Drawing Sheets

(51) Int. Cl.
*H01M 8/2457* (2016.01)
*H01M 8/242* (2016.01)
*H01M 8/0254* (2016.01)
*H01M 8/04119* (2016.01)
*H01M 8/1018* (2016.01)
*H01M 8/241* (2016.01)

(52) U.S. Cl.
CPC ......... *H01M 8/1018* (2013.01); *H01M 8/242* (2013.01); *H01M 8/2457* (2016.02); *H01M 8/241* (2013.01); *H01M 2008/1095* (2013.01)

(58) Field of Classification Search
CPC ................ H01M 8/242; H01M 8/241; H01M 2008/1095
USPC .................................................. 429/457, 514
See application file for complete search history.

(56) References Cited

FOREIGN PATENT DOCUMENTS

| | | |
|---|---|---|
| JP | 2005-135763 A | 5/2005 |
| JP | 2006-6253038 A | 9/2006 |
| JP | 2009-048775 A | 3/2009 |
| JP | 2009/08744 A | 4/2009 |
| JP | 2011-150801 A | 8/2011 |
| JP | 2011-165559 A | 8/2011 |
| JP | 2012-226914 A | 11/2012 |

OTHER PUBLICATIONS

International Search Report with English translation for PCT/JP2014/051347, dated Mar. 11, 2014, 5 pgs.
International Preliminary Report on Patentability for PCT/W2014/051347, dated Sep. 1, 2015, 6 pgs.

* cited by examiner

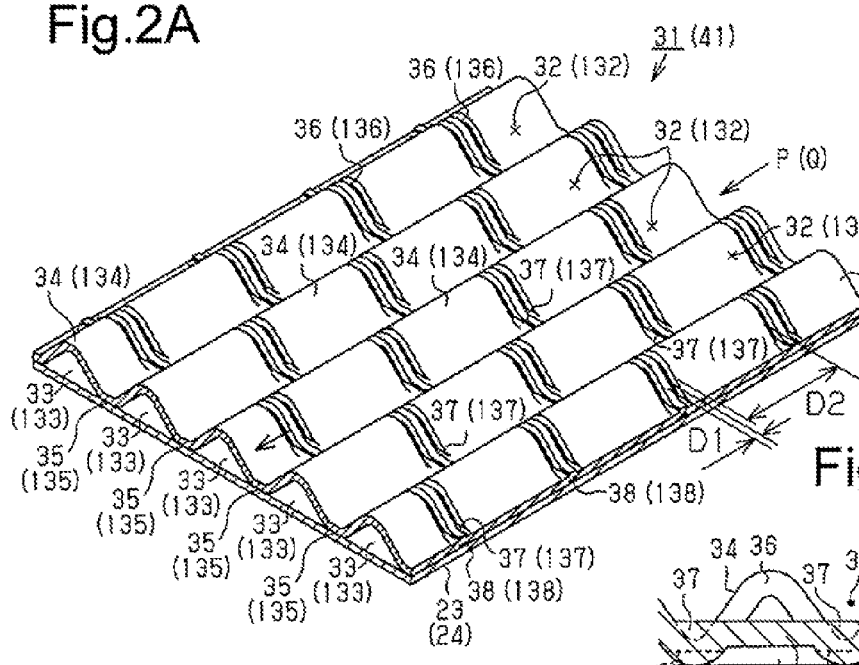
Fig.2A
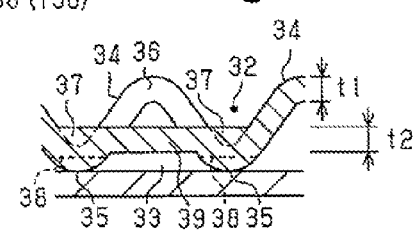
Fig.2B
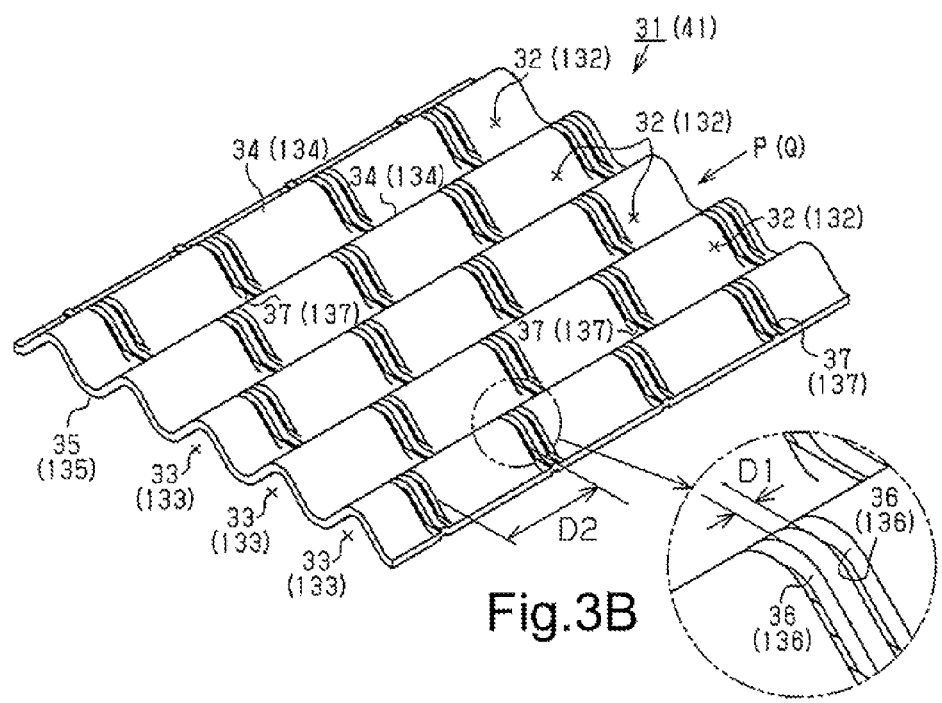
Fig.3A
Fig.3B

GAS FLOW CHANNEL FORMING BODY FOR FUEL CELL, AND FUEL CELL

RELATED APPLICATIONS

The present application is a National Phase entry of PCT Application No. PCT/JP2014/051347, filed Jan. 23, 2014, which application claims priority to Japanese Patent Application No. 2013-039097, filed Feb. 28, 2013, both of said applications being hereby incorporated by reference in their entirety.

BACKGROUND OF THE INVENTION

The present invention relates to a gas flow channel forming body for a fuel cell, and a fuel cell.

In a fuel cell disclosed in Patent Document 1, electrode catalyst layers are respectively provided on both surfaces of a solid polymer electrolyte membrane and gas diffusion layers are respectively laminated outside the electrode catalyst layers to form a membrane electrode assembly. A gas flow channel forming body is located between the membrane electrode assembly and a separator. A water introduction channel is provided between the gas flow channel forming body and the separator. Water generated in electrode reaction in the membrane electrode assembly is discharged to the water introduction channel via a communication channel provided between a gas flow channel and the water introduction channel.

In a gas flow channel forming body, that is, in a separator unit, of a fuel cell disclosed in Patent Document 2, grooves are formed between protrusions provided in parallel, and each protrusion has an opening. Generated water enters the separator unit via the grooves and the openings and is discharged therefrom.

In a gas flow channel forming body in Patent Document 3, corrugated concavities and convexities are formed on a metal flat plate and arranged in parallel, so that grooves and ribs are formed. Hollow parts in the ribs and the grooves form gas flow channels. In the concavities and convexities, gaps are provided at an interval along the gas flow channels. The gaps allow the hollow parts to communicate with the groove parts. Chip-shaped cut and raised parts are formed in the ribs corresponding to the gaps. The cut and raised parts change a gas flow from the groove parts to the hollow parts or from the hollow parts to the groove parts.

PRIOR ART DOCUMENTS

Patent Documents

Patent Document 1: Japanese Laid-Open Patent Publication No. 2011-150801
Patent Document 2: Japanese Laid-Open Patent Publication No. 2006-253038
Patent Document 3: Japanese Examined Patent Publication No. 8-10600

SUMMARY OF THE INVENTION

In the fuel cells having the gas flow channel forming bodies in Patent Documents 1 and 2, during wet time, that is, when water is present in the water introduction channel, generated water can move from the membrane electrode assembly toward the separator (water introduction channel) with the water in the water introduction channel being priming water. However, during dry time, that is, when water is absent in the water introduction channel, the generated water is no easily moved from the membrane electrode assembly toward the separator (water introduction channel), which causes a problem that gas is prevented from being diffused to the membrane electrode assembly.

In the device in Patent Document 3, the gap between the adjacent rib parts in the gas flow direction is needed to be configured to be wide in order to secure the amount of cutting and raising at the cut and raised parts for changing the gas flow and the allowance for allowing the gas to pass through. Accordingly, similarly to Patent Documents 1 and 2, also in the device of Patent Document 3, during dry time, the generated water is not easily moved from the membrane electrode assembly toward the separator, which causes a problem that gas is prevented from being diffused to the membrane electrode assembly.

An objective of the present invention is to provide a gas flow channel forming body for a fuel cell, and a fuel cell capable of, during dry time, allowing the movement of water to a water introduction channel to be smooth and restraining water from staying in a gas flow channel to facilitate diffusion of gas.

To achieve the foregoing objective and in accordance with one aspect of the present invention, a gas flow channel forming body for a fuel cell is provided that includes a partition wall having a first surface and a second surface opposite to the first surface, a plurality of protrusions provided in parallel on the first surface, a gas flow channel provided between adjacent two of the protrusions, a plurality of water introduction channels on the second surface, a plurality of communication channels, and a plurality of intermediate structure bodies. Each water introduction passage is provided in a valley positioned opposite to one of the protrusions. Each communication channel is provided in the partition wall to allow the gas flow channel to communicate with the water introduction channel and water to pass therebetween. Each intermediate structure body is provided in one of the water introduction channels to be opposed to one of the communication channels. A set of communication channels is formed by at least a pair of the communication channels arranged at a first interval. The set of communication channels and an adjacent set of communication channels are arranged at a second interval in each protrusion.

Each communication channel is preferably formed from a vertex of the protrusion toward a valley of the gas flow channel.

Each set of the communication channels provided in the one of the protrusions is preferably arranged to be displaced from each set of the communication channels provided in an adjacent protrusion.

The protrusions, the communication channels, and the intermediate structure bodies are preferably formed by pressing.

A gap in which capillary action of water works is preferably provided between an adjacent two of the adjacent intermediate structure bodies.

The communication channels are preferably formed by a slit in which capillary action works, and a gap between the intermediate structure bodies preferably communicates with the communication channel.

The second interval is preferably larger than the first interval.

A fuel cell according to the present invention preferably includes a membrane electrode assembly including a solid polymer electrolyte membrane, two electrode catalyst layers respectively laminated on an anode side surface and on a cathode side surface of the solid polymer electrolyte membrane, and gas diffusion layers laminated outside the respective electrode catalyst layers. The fuel cell preferably includes gas flow channel forming bodies laminated on the respective gas diffusion layers of the membrane electrode assembly. A single cell is preferably configured by arranging each gas diffusion layer of the membrane electrode assembly between a pair of separators. Each gas flow channel forming body is preferably formed by the above described gas flow channel forming body.

According to the present invention, during dry time, the movement of water to a water introduction channel is allowed to be performed smoothly and water is restrained from staying in a gas flow channel to facilitate diffusion of gas.

BRIEF DESCRIPTION OF THE DRAWINGS

FIG. 2A is a partial perspective view of first and second gas flow channel forming bodies;
FIG. 2B is an explanatory drawing of a gas flow channel and a water introduction channel;
FIG. 3A is a perspective view of a communication channel of the first and second gas flow channel forming bodies;
FIG. 3B is a partial enlarged view of the communication channel illustrated in FIG. 3A.

DETAILED DESCRIPTION OF THE PREFERRED EMBODIMENTS

Hereafter, one embodiment according to the present invention will be described with reference to FIGS. 1A to 5D.

Figure 1A:
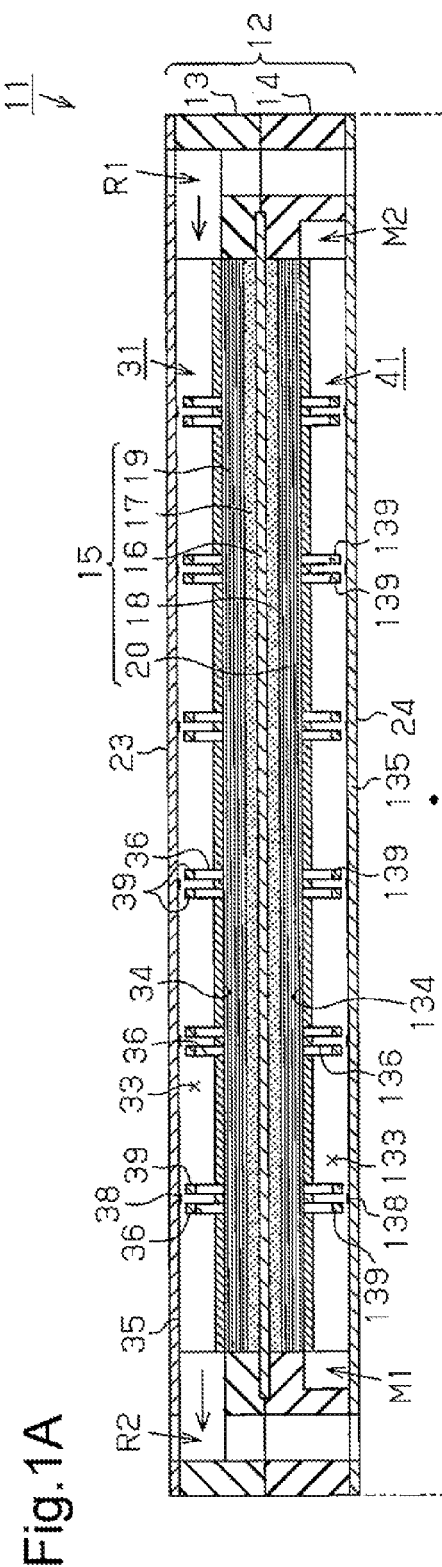
FIG. 1A is a cross-sectional view of a fuel cell according to one embodiment.
Figure 1B:
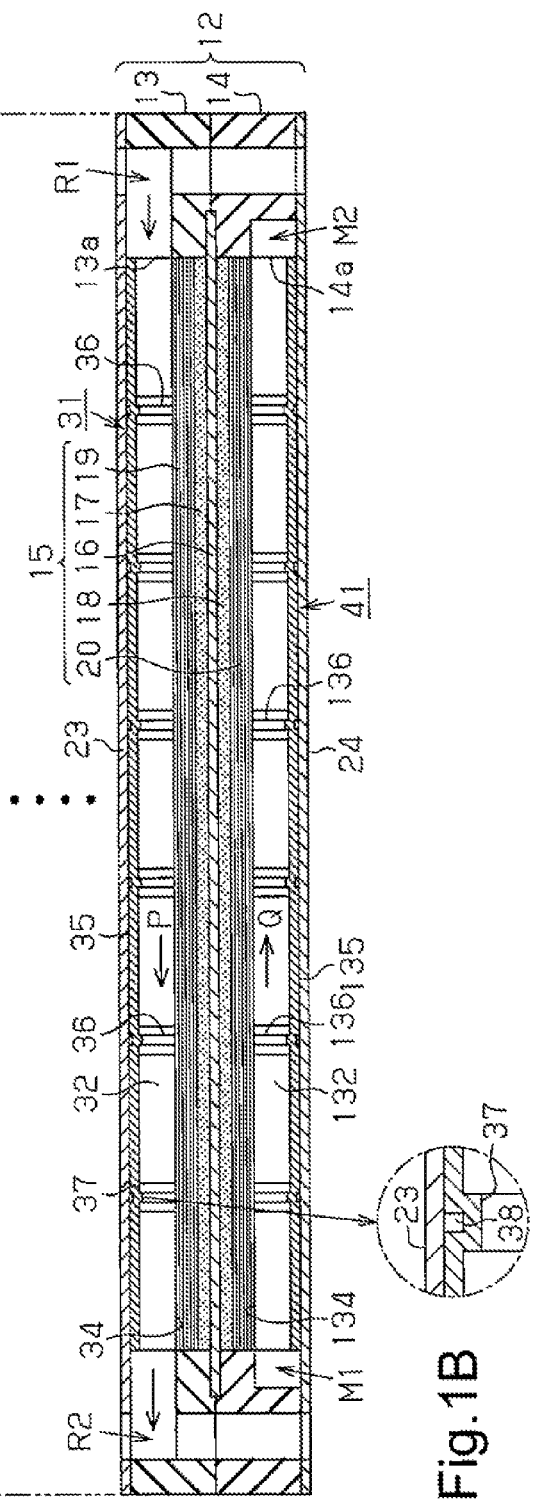
FIG. 1B is a partially enlarged view of the fuel cell illustrated in FIG. 1A.

As illustrated in FIGS. 1A and 1B, a fuel cell 11 according to the present embodiment is a solid polymer type fuel cell and is configured by stacking a number of laminated single cells 12 and constituent members (not shown) for coolant flow channels.

Each single cell 12 includes first and second frames 13 and 14, which are quadrangular and are made of synthetic resin such as synthetic rubber, and a membrane electrode assembly (MEA: Membrane Electrode Assembly) 15. Inside the first frame 13, a flow channel space 13a for fuel gas is defined. Inside the second frame 14, a flow channel space 14a for oxidant gas is defined.

The membrane electrode assembly 15 is provided inside the first and second frames 13 and 14. The single cell 12 includes a first gas flow channel forming body 31 contained in the flow channel space 13a for fuel gas and a second gas flow channel forming body 41 contained in the flow channel space 14a of oxidant gas. The first gas flow channel forming body 31 is made of ferrite-based stainless steel (SUS), titanium alloy, or carbon. The second gas flow channel forming body 41 is made of ferrite-based stainless steel (SUS), titanium alloy, carbon, gold-plated titanium alloy, or gold alloy. Furthermore, the single cell 12 includes a first separator 23 and a second separator 24. The separators 23 and 24 are flat plate-shaped and are made of ferrite-based SUS (stainless steel), titanium alloy, or carbon. The first separator 23 is joined with the first frame 13 via a sealing ring (not shown). The second separator 24 is joined with the second frame 14 via a sealing ring (not shown).

The membrane electrode assembly 15 is formed by an electrolyte membrane 16 made of solid polymer, a first electrode catalyst layer 17 and a second electrode catalyst layer 18, and a first gas diffusion layer 19 and a second gas diffusion layer 20.

The first electrode catalyst layer 17 is formed of catalyst laminated on an anode side surface of the electrolyte membrane 16, that is, the upper surface thereof. The second electrode catalyst layer 18 is formed of catalyst laminated on a cathode side surface of the electrolyte membrane 16, that is, the lower surface thereof. The electrolyte membrane 16 is formed of a solid polymer material having excellent proton conductivity in its moist state. Examples of the solid polymer material include a fluorine-based polymer membrane (for example, Nafion membrane made by DuPont). The first and second electrode catalyst layers 17 and 18 include carbon particles (not shown). Onto the surfaces of the carbon particles, a number of catalyst particles made of platinum (Pt) attach. Catalysis with the catalyst particles increases the power generation efficiency in power generation of the fuel cell. Platinum contained in the first and second electrode catalyst layers 17 and 18 has action with which hydrogen is promoted to be cleaved into a proton and an electron and generation reaction of water from oxygen, a proton and an electron is promoted. Any material other than platinum may be used as long as it has the similar action.

On the anode side first electrode catalyst layer 17 and the cathode side second electrode catalyst layer 18, the first gas diffusion layer 19 and the second gas diffusion layer 20, which have electric conductivity, are laminated, respectively. The first and second gas diffusion layers 19 and 20 are formed, typically, by carbon paper or carbon cloth.

Next, the first gas flow channel forming body 31 and the second gas flow channel forming body 41 will be described. Since the first gas flow channel forming body 31 positioned on the anode side and the second gas flow channel forming body 41 positioned on the cathode side in FIGS. 1A and 1B have the same configuration, the configuration of the first gas flow channel forming body 31 will be described. These may have different configurations. For the second gas flow channel forming body 41, the same constituents as the constituents 32 to 39 of the first gas flow channel forming body 31 are given the signs having "100" added to those of the respective constituents 32 to 39 of the first gas flow channel forming body 31, and their description is omitted. Furthermore, for the second gas flow channel forming body 41, "first separator 23" has to be replaced by "second separator 24", "gas diffusion layer 19" be replaced by "second gas diffusion layer 20", and "fuel gas flow direction P" be replaced by "oxidant gas flow direction Q" in the description below.

In FIG. 2A, arrow P indicates a fuel gas flow direction. As illustrated in FIG. 2A, in a corrugated partition wall W of the first gas flow channel forming body 31, groove-shaped gas flow channels 32 are provided in parallel on a side surface facing the gas diffusion layer 19, that is, on a first surface. In the partition wall W of the first gas flow channel forming body 31, water introduction channels 33 are provided in parallel on a side surface facing the first separator 23, that is, on a second surface. The gas flow channels 32 and the water introduction channels 33 are separated by the partition wall W. In the present embodiment, a cross-sectional shape of the partition wall W in a direction perpendicular to the fuel gas flow direction P is formed to be wavy along a sine curve. The cross-sectional shape is not limited to the sine-curved wave shape but may be, for example, another wave shape such as a rectangular wave shape, a trapezoidal wave shape and a triangular wave shape.

The gas flow channels 32 are formed between protrusions 34 protruding toward the gas diffusion layer 19, extend in the fuel gas flow direction P, and are arranged in parallel. Also, the water introduction channels 33 are formed between protrusions 35 protruding toward the first separator 23, extend in the same direction as the fuel gas flow direction P, and are arranged in parallel. In other words, each water introduction channel 33 is provided in each valley opposite to each protrusion 34, on the second surface of the partition wall W.

As illustrated in FIGS. 2A and 3A, in the first gas flow channel forming body 31, communication channels 36 are formed from the vertexes of the protrusions 34 toward the valleys of the gas flow channels 32 by incision. The communication channels 36 allow the gas flow channels 32 to communicate with the water introduction channels 33. The communication channels 36 are formed by pressing of the first gas flow channel forming body 31 and are arranged to be perpendicular to the fuel gas flow direction P (that is, the direction in which the gas flow channels 32 extend). In the present embodiment, the communication channels 36 are formed as slits. The communication channel 36 has a cross-sectional shape in which capillary action works and an opening cross-sectional area in which the capillary action works. The communication channel 36 is not limited to a slit as long as it has a cross-sectional shape in which capillary action works and an opening cross-sectional area in which the capillary action works.

As illustrated in FIGS. 2A, 3A, and 3B, one set of communication channels 36 is formed by a pair of communication channels 36 that are arranged at a first interval D1. In each protrusion 34, the one set of communication channels 36 and the adjacent set of communication channels 36 are arranged at a second interval D2. The second interval D2 is equal to the arrangement pitch of the individual sets of communication channels 36. In each protrusion 34, the second interval D2 is larger than the first interval D1.

Figure 5A:
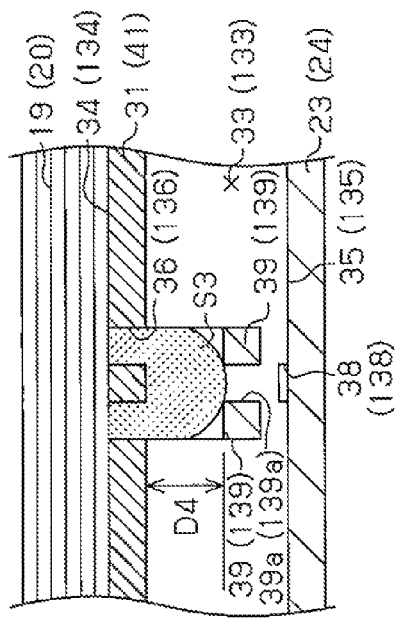
FIGS. 5A to 5D are explanatory drawings of operation of an embodiment.
Figure 5B:
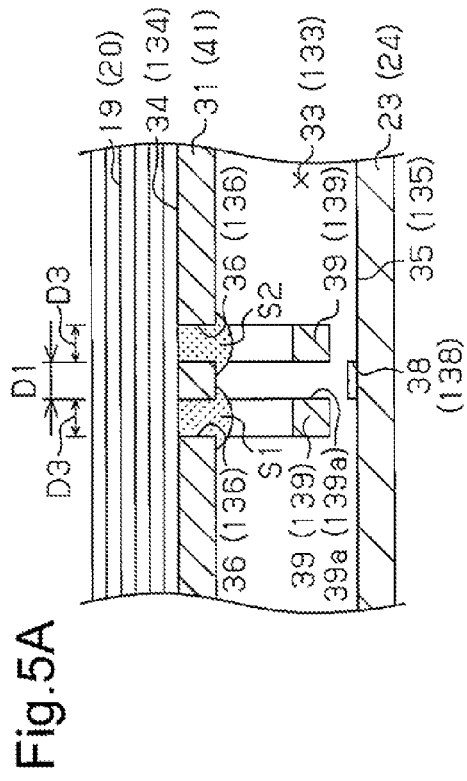

The first interval D1 is configured to have a dimension such that, when drops S1 and S2 respectively infiltrate each set of communication channels 36 from the first surface of the first gas flow channel forming body 31 to grow, as illustrated in FIG. 5A, parts of the drops in the water introduction channel 33 can be joined with each other as shown in FIG. 5B. Also, as illustrated in FIG. 5A, a width D3 of the communication channel 36 is smaller than the second interval D2 and has a dimension corresponding to the cross-sectional shape in which the capillary action works as mentioned above. In the present embodiment, while the width D3 is configured to be equal to the first interval D1, the width D3 may be longer than the first interval D1 or may be shorter than the same.

Figure 5C:
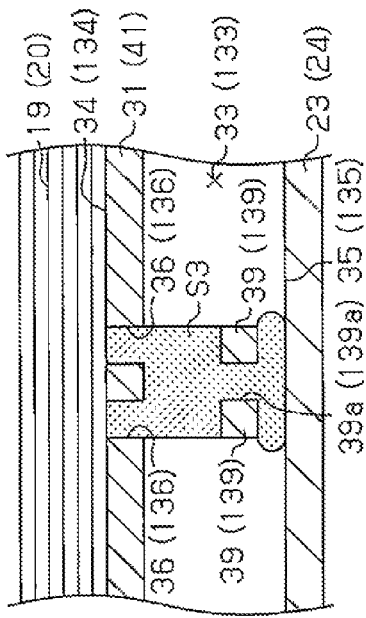

As illustrated in FIG. 2B, in the water introduction channel 33 between the adjacent protrusions 35, a pair of intermediate structure bodies 39, which are formed therebetween simultaneously when the pair of communication channels 36, are formed by pressing are included. As illustrated in FIG. 5C, between the intermediate structure bodies 39, a gap 39a is formed and its width, that is, the interval between the intermediate structure bodies 39 is configured to be equal to the first interval D1 between each set of communication channels 36.

As illustrated in FIG. 5B, an interval D4 between the intermediate structure bodies 39 and the inner top surface of the protrusion 34 is configured to have a dimension such that, when the drops S1 and S2 respectively infiltrate each set of communication channels 36 from the first surface side to grow and be joined with each other to form one drop S3 or in the occasion of its further growth after that, as illustrated in FIGS. 5B and 5C, the drop S3 can come into contact with the intermediate structure bodies 39.

As illustrated in FIGS. 2A and 2B, in the groove between the protrusions 34 of the first gas flow channel forming body 31, ribs 37 perpendicular to the fuel gas flow direction P are provided at a predetermined pitch by pressing simultaneously in forming the communication channels 36. In the present embodiment, the ribs 37 are provided to be positioned between the individual sets of communication channels 36.

Each set of communication channels 36 provided for each protrusion 34 is displaced by a predetermined pitch (½ pitch in the present embodiment) relative to each set of communication channels provided for the adjacent protrusion 34.

As illustrated in FIGS. 1A and 2B, in the rib 37, a passage 38 extending along the length of the rib 37 is formed. Via the passage 38, water is allowed to pass between the adjacent water introduction channels 33. In the present embodiment, while the first gas flow channel forming body 31 is formed from one metal plate and a thickness t2 of the portion of the rib 37 illustrated in FIG. 2B is substantially the same as a thickness t1 of the corrugated portion of the first gas flow channel forming body 31, the relationship between the thicknesses is not particularly limited.

As illustrated in FIGS. 1A and 1B, the vertex of the protrusion 34 comes into contact with the gas diffusion layer 19 and the vertex of the protrusion 35 comes into contact with the first separator 23. In FIGS. 1A and 1B, the uppermost single cell 12 is illustrated as a cross section taken to explicitly represent the water introduction channel 33. In contrast, the lower most single cell 12 is illustrated as a cross section taken to explicitly represent the gas flow channel 32.

As illustrated in FIG. 1A, in the frames 13 and 14 and the separators 23 and 24 of the single cell 12, an introduction passage R1 for supplying fuel gas (hydrogen gas) from a non-illustrated fuel gas supply source (for example, hydrogen cylinder) to the gas flow channel 32 of the fuel is formed, and an outlet passage R2 for discharging fuel off-gas having been used for power generation to the outside is formed.

In the frames 13 and 14 and the separators 23 and 24 of the single cell 12, an introduction passage M1 for introducing oxidant gas (air) from a non-illustrated oxidant gas supply source (for example, compressor) to the gas flow channel 132 of the oxidant is formed, and an outlet passage M2 for discharging out oxidation off-gas having been used for power generation to the outside is formed.

Operations of the fuel cell 11, which is constructed as above, will hereafter be described.

In FIG. 1A, fuel (hydrogen) gas is supplied from the introduction passage R1 into the gas flow channel 32 and flows to the left in the drawing in the fuel gas flow direction P. The fuel gas passes through the first gas diffusion layer 19 in the gas flow channel 32, and thereby, is diffused to be uniformly supplied to the first electrode catalyst layer 17. In FIG. 1A, the oxidant (oxygen) gas supplied by the compressor is supplied to the gas flow channel 132 of the second gas flow channel forming body 41 through the introduction passage M1 and flows to the right in the drawing in the oxidant gas flow direction Q.

The oxidant gas passes through the second gas diffusion layer 20 in the gas flow channel 132, and thereby, is diffused to be uniformly supplied to the electrode catalyst layer 18.

Supply of the fuel (hydrogen) gas and the oxidant (oxygen) gas generates electrode reaction in the membrane electrode assembly 15 and power generation is performed. As a result, desired power is output from the fuel cell 11 formed by the laminated single cells 12 and the coolant flow channel (not shown).

As illustrated in FIG. 1A, some of the fuel gas that has not been used for the power generation is discharged as fuel off-gas to the outside from the gas flow channel 32 through the outlet passage R2. Meanwhile, the oxidant gas that has not been used for the power generation is discharged as oxidation off-gas to the outside from the gas flow channel 132 through the outlet passage M2.

Figure 4A:
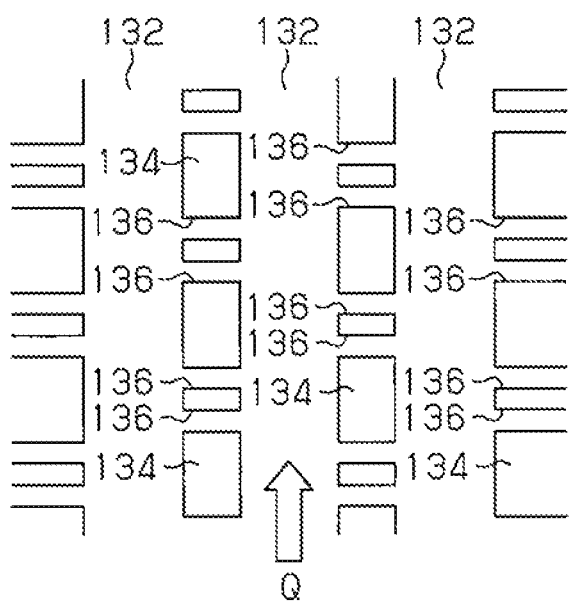
FIGS. 4A and 4B are explanatory drawings of operation of an embodiment.
Figure 4B:
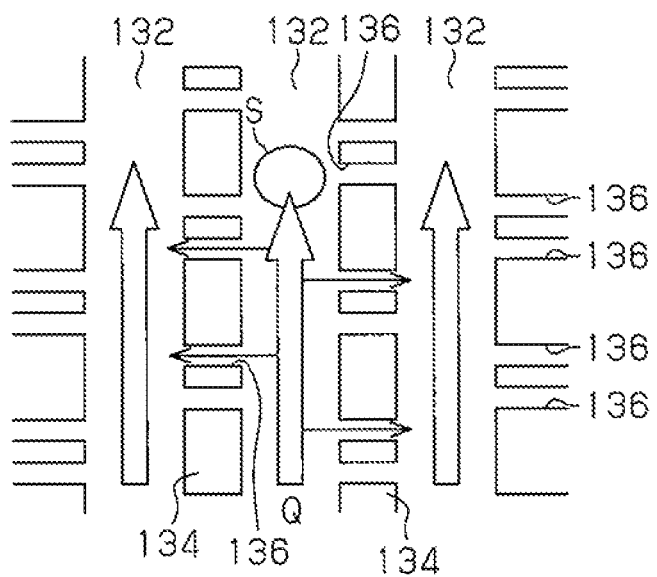

The electrode reaction in the membrane electrode assembly 15 generates water in the gas flow channel 132 of the second gas flow channel forming body 41 on the cathode side. As illustrated in FIGS. 4A and 4B, some of the generated water is discharged to the outlet passage M2 due to flow pressure of the oxidant gas flowing in the gas flow channels 132. That is, during high load of the fuel cell, the oxidant gas does not flow in the communication channels 136 but flows, pushing out the generated water in the gas flow channels 132. Some of the generated water flows to the water introduction channels 133 through the communication channels 136 and is discharged to the outlet passage M2.

For example, as illustrated in FIG. 4B, the generated water flowing out to the water introduction channel 133 forms a drop S due to surface tension depending on the dimension of the drainage side end of the water introduction channel 133 when it goes out of the drainage side end of the water introduction channel 133. During wet time of the water introduction channel 133, when the drop S stays at the rib 37, it is introduced into the water introduction channel 133 from a proximal communication channel 36 due to the capillary action with water in the water introduction channel 133 being priming water, and is discharged from the water introduction channel 133.

During dry time when water for priming is not present in the water introduction channel 133, as illustrated in FIG. 5A, in the vertex of the protrusion 134, which comes into contact with the second gas diffusion layer 20, the generated water infiltrates the inside of the communication channels 136 due to the capillary action to form the drops S1 and S2.

Figure 5D:
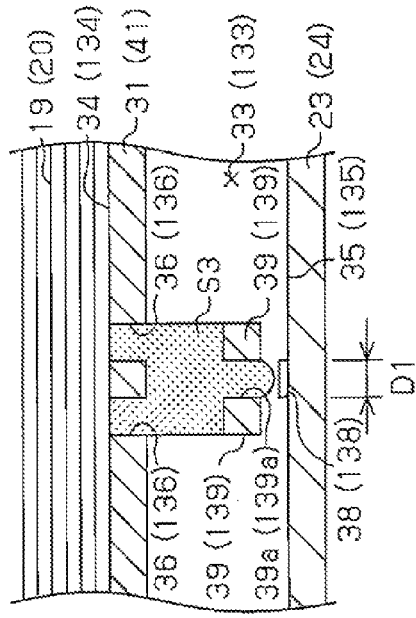

Then, as illustrated in FIG. 5B, further infiltration of the generated water allows the drops S1 and S2 to grow, and thereby, the drops are joined with each other to form the drop S3. Immediately after the joining or when the drop S3 is further allowed to grow, the drop S3 comes into contact with the intermediate structure bodies 139, reaches the gap 139a between the intermediate structure bodies 139, and is drawn in the gap 139a due to the capillary action. As illustrated in FIG. 5D, the drop S3 having been drawn in the gap 139a reaches the water introduction channel 33 in the second separator 24.

In this way, a water path from the second gas diffusion layer 20 to the water introduction channel 133 is formed. As a result, the drop S3 having reached the water introduction channel 133 is discharged due to gas pressure in the water introduction channel 133. Formation of the water path as mentioned above enables the movement of the generated water to the water introduction channel to be smooth even during dry time. Also during wet time, the similar performance can be attained. Hence, the water can be allowed to stay to a less extent in the gas flow channel 132, the gas can be diffused smoothly, and power generation performance is improved.

Durability of the fuel cell with respect to condition fluctuation from the dry time state to the excessively moist state is improved. Operation condition control of the fuel cell is also facilitated.

Since the pressure of the oxidant gas in the fuel gas flow channel 132 is higher than the pressure of the fuel gas in the fuel gas flow channel 32, the pressure difference therebetween allows some of the generated water to infiltrate the second electrode catalyst layer 18 on the cathode side, the solid polymer electrolyte membrane 16, the first electrode catalyst layer 17, and the first gas diffusion layer 19, and to flow into the fuel gas flow channel 32 as infiltration water.

The infiltration water is discharged to the outlet passage R2 due to the flow pressure of the fuel gas flowing in the gas flow channel 32. In this case, it is discharged from the water introduction channel 33 similarly both during wet time and during dry time similarly to the generated water described above.

The fuel cell and the gas flow channel forming body according to the present embodiment have the following advantages.

(1) The fuel cell and the gas flow channel forming body according to the present embodiment include: a partition wall W having a first surface and a second surface opposite to the first surface; protrusions 34, 134 provided in parallel on the first surface; a gas flow channel 32, 132 provided between two of the adjacent protrusions 34, 134; water introduction channels 33, 133, each of which is provided in a valley positioned opposite to each protrusion 34, 134, on the second surface; communication channels 36, 136, each of which is provided in the partition wall W to allow each gas flow channel 32, 132 to communicate with each water introduction channel 33, 133 and water to be permeable therebetween; and intermediate structure bodies 39, 139, each of which is provided to be opposed to each communication channel 36, 136 in each water introduction channel 33, 133. As to the communication channels 36, 136, a set of communication channels 36, 136 is formed by a pair of communication channels 36, 136 arranged at a first interval D1, and the set of communication channels 36, 136 and the adjacent set of communication channels 36, 136 are arranged at a second interval D2 in each protrusion.

As a result, during dry time, the movement of the generated water and the infiltration water to the water introduction channel are made smooth. The water is restrained from staying in the gas flow channel, which improves the diffusion of the gas.

(2) In the fuel cell and the gas flow channel forming body according to the present embodiment, the communication channel 36, 136 is formed from the vertex of the protrusion 34, 134 toward the valley of the gas flow channel 32, 132. As a result, not only during wet time of the water introduction channel but also during dry time thereof, the water from the first gas diffusion layer 19 and second gas diffusion layer 20 is guided from the vertex into the communication channel 36, 136 due to the capillary action.

(3) In the fuel cell and the gas flow channel forming body according to the present embodiment, each set of communication channels 36, 136 provided in each protrusion 34, 134 is displaced from each set of communication channels provided in the adjacent protrusion 34, 134. As a result, not only during wet time of the water introduction channel but also during dry time thereof, the water in the first gas diffusion layer and the second gas diffusion layer is evenly guided into the water introduction channel.

(4) In the fuel cell and the gas flow channel forming body according to the present embodiment, the protrusions 34, 134, the communication channels 36, 136 and the intermediate structure bodies 39, 139 are formed by pressing. As a result, the protrusions, the communication channels, and the intermediate structure bodies can be efficiently formed in the gas flow channel forming body.

(5) In the fuel cell and the gas flow channel forming body according to the present embodiment, a gap 39a, 139a, in which capillary action of water works, is included between the intermediate structure bodies 39, 139. As a result, according to the present embodiment, after the drop having infiltrated the communication channel comes into contact with the intermediate structure bodies, it is guided from the gap into the water introduction channel due to the capillary action. As a result, the water path from the gas diffusion layer to the water introduction channel can be easily formed.

(6) In the fuel cell and the gas flow channel forming body according to the present embodiment, the communication channel 36, 136 is formed by of a slit. As a result, the slit achieves the advantages in the items (1) to (5) shown above.

The present embodiment may be modified as follows.

In the above illustrated embodiment, the first gas flow channel forming body 31 and the second gas flow channel forming body 41 are provided separately from the first separator 23 and the second separator 24. However, at least any one of the first gas flow channel forming body 31 and the second gas flow channel forming body 41 may be provided integrally with the separator.

In the above illustrated embodiment, the groove-shaped gas flow channels 32, 132 are formed to be straight line-shaped and the water introduction channels 33, 133 are provided on the side surface facing the first separator 23 to be straight line-shaped. The shape is not necessarily limited to a straight line but any other shape such as a curved shape may be adopted.

In the above illustrated embodiment, the gap 39a, 139a between the intermediate structure bodies 39, 139 may be omitted.

In the above illustrated embodiment, the set of communication channels is formed by a pair of communication channels 36, 136, a set of communication channels may be formed by three or more of the communication channels.

In the above illustrated embodiment, a communication channel that does not form a set may be provided in any one of the gas flow channel forming bodies to omit the intermediate structure body.

DESCRIPTION OF THE REFERENCE NUMERALS

11 Fuel cell
15 Membrane electrode assembly
16 Solid polymer electrolyte membrane
17 First electrode catalyst layer
18 Second electrode catalyst layer
19 First gas diffusion layer
20 Second gas diffusion layer
23 First separator
24 Second separator
31 First gas flow channel forming body
32 Gas flow channel
33 Water introduction channel
36 Communication channel
39 Intermediate structure body
39a Gap
41 Second gas flow channel forming body
132 Gas flow channel
133 Water introduction channel
136 Communication channel
139 Intermediate structure body
139a Gap

The invention claimed is:

1. A gas flow channel forming body for a fuel cell, comprising:
    a partition wall having a first surface and a second surface opposite to the first surface;
    a plurality of protrusions provided in parallel on the first surface;
    a gas flow channel provided between adjacent two of the protrusions;
    a plurality of water introduction channels on the second surface, wherein each water introduction passage is provided in a valley positioned opposite to one of the protrusions;
    a plurality of communication channels, each of which is provided in the partition wall to allow the gas flow channel to communicate with the water introduction channel and water to pass therebetween; and
    a plurality of intermediate structure bodies, each of which is provided in one of the water introduction channels to be opposed to one of the communication channels, wherein
    a set of communication channels is formed by at least a pair of the communication channels arranged at a first interval, and
    the set of communication channels and an adjacent set of communication channels are arranged at a second interval in each protrusion.

2. The gas flow channel forming body for a fuel cell according to claim 1, wherein each communication channel is formed from a vertex of the protrusion toward a valley of the gas flow channel.

3. The gas flow channel forming body for a fuel cell according to claim 1, wherein each set of the communication channels provided in the one of the protrusions is arranged to be displaced from each set of the communication channels provided in an adjacent protrusion.

4. The gas flow channel forming body for a fuel cell according to claim 1, wherein the protrusions, the communication channels, and the intermediate structure bodies are formed by pressing.

5. The gas flow channel forming body for a fuel cell according to claim 1, wherein a gap in which capillary action of water works is provided between an adjacent two of the adjacent intermediate structure bodies.

6. The gas flow channel forming body for a fuel cell according to claim 1, wherein
    the communication channels are formed by a slit in which capillary action works, and
    a gap between the intermediate structure bodies communicates with the communication channel.

7. The gas flow channel forming body for a fuel cell according to claim 1, wherein the second interval is larger than the first interval.

8. A fuel cell comprising a membrane electrode assembly including a solid polymer electrolyte membrane, two electrode catalyst layers respectively laminated on an anode side surface and on a cathode side surface of the solid polymer electrolyte membrane, and gas diffusion layers laminated outside the respective electrode catalyst layers, wherein
    the fuel cell includes gas flow channel forming bodies laminated on the respective gas diffusion layers of the membrane electrode assembly, a single cell is configured by arranging each gas diffusion layer of the membrane electrode assembly between a pair of separators,
the fuel cell is configured by stacking a plurality of the single cells, and
each gas flow channel forming body is formed by the gas flow channel forming body according to claim 1.

* * * * *

UNITED STATES PATENT AND TRADEMARK OFFICE
CERTIFICATE OF CORRECTION

PATENT NO. : 9,917,310 B2
APPLICATION NO. : 14/421969
DATED : March 13, 2018
INVENTOR(S) : Keiji Hashimoto et al.

It is certified that error appears in the above-identified patent and that said Letters Patent is hereby corrected as shown below:

On the Title Page

On page 2, Under References Cited and FOREIGN PATENT DOCUMENTS, please delete "JP 2009/08744 A 4/2009" and insert -- JP 2009/087844 A 4/2009 --.

Signed and Sealed this
Twenty-ninth Day of May, 2018

Andrei Iancu
*Director of the United States Patent and Trademark Office*